United States Patent
Estripeau (10) Patent No.: US 11,686,858 B2
(45) Date of Patent: Jun. 27, 2023

(54) APPARATUS FOR LOCATING AEROSOL GENERATING CONSUMABLES

(71) Applicant: JT International S.A., Geneva (CH)

(72) Inventor: Frederic Claude Hervé Estripeau, Divonne les Bains (FR)

(73) Assignee: JT International SA

( * ) Notice: Subject to any disclaimer, the term of this patent is extended or adjusted under 35 U.S.C. 154(b) by 124 days.

(21) Appl. No.: 16/764,584

(22) PCT Filed: Dec. 18, 2018

(86) PCT No.: PCT/EP2018/085640
§ 371 (c)(1),
(2) Date: May 15, 2020

(87) PCT Pub. No.: WO2019/121774
PCT Pub. Date: Jun. 27, 2019

(65) Prior Publication Data
US 2020/0387955 A1    Dec. 10, 2020

(30) Foreign Application Priority Data
Dec. 18, 2017    (EP) ..................... 17208196

(51) Int. Cl.
*G06Q 30/00*    (2023.01)
*G01S 19/42*    (2010.01)
(Continued)

(52) U.S. Cl.
CPC ............. *G01S 19/42* (2013.01); *A24F 40/53* (2020.01); *A24F 40/60* (2020.01); *A24F 40/65* (2020.01);
(Continued)

(58) Field of Classification Search
CPC ........ G01S 19/42; H04W 4/024; A24F 40/53; A24F 40/65; A24F 40/60; G06Q 30/0639
(Continued)

(56) References Cited

U.S. PATENT DOCUMENTS 7,596,509 B1 *  9/2009 Bryson .............. G06Q 30/0643
                                                     705/27.2
7,792,709 B1    9/2010 Trandal et al.
(Continued)

FOREIGN PATENT DOCUMENTS

EP          2813987 A2     12/2014
JP          2014518574 A    7/2014
(Continued)

OTHER PUBLICATIONS

"Texas Select Vapor, E-Cigarette shop, launches new, fully responsive website," Progressive Digital Media Retail News [London] Jul. 15, 2014.; Dialog #1546160453, 2pgs. (Year: 2014).*
(Continued)

*Primary Examiner* — Robert M Pond
(74) *Attorney, Agent, or Firm* — Lerner David LLP (57) ABSTRACT

A system includes a smartphone and an electronic cigarette. The smartphone includes a GPS receiver that can determine a position. The smartphone can communicate over a network with a retailer information server that stores information regarding retailers of aerosol generating consumables, including at least a position of the retailers. The smartphone is configured to determine a plurality of distances between the position associated with the smartphone and the respective positions of the retailers. The smartphone can display a map including an indicator for the user's position and icons corresponding to the position of relevant retailers. This can assist a user of the smartphone in locating retailers of aerosol generating consumables.

10 Claims, 5 Drawing Sheets

(51) Int. Cl.
*H04W 4/024* (2018.01)
*A24F 40/53* (2020.01)
*A24F 40/60* (2020.01)
*G06Q 30/0601* (2023.01)
*A24F 40/65* (2020.01)

(52) U.S. Cl.
CPC ........ *G06Q 30/0639* (2013.01); *H04W 4/024* (2018.02)

(58) Field of Classification Search
USPC .................................................. 705/26, 27
See application file for complete search history.

(56) References Cited

U.S. PATENT DOCUMENTS

| | | | | |
|---|---|---|---|---|
| 9,747,627 | B2* | 8/2017 | Wright | G06Q 30/06 |
| 11,517,042 | B2* | 12/2022 | Gorelick | H04L 12/1827 |
| 2009/0150218 | A1* | 6/2009 | Brunner | G06Q 30/0261 |
| | | | | 705/14.58 |
| 2009/0187489 | A1* | 7/2009 | Mallick | G06Q 30/06 |
| | | | | 705/26.1 |
| 2012/0253982 | A1 | 10/2012 | Wright | |
| 2013/0319439 | A1* | 12/2013 | Gorelick | A24F 40/53 |
| | | | | 131/329 |
| 2015/0100441 | A1* | 4/2015 | Alarcon | G06Q 20/20 |
| | | | | 705/16 |
| 2015/0228004 | A1* | 8/2015 | Bednarek | G06Q 30/0633 |
| | | | | 705/26.8 |
| 2015/0379463 | A1 | 12/2015 | Sarangi | |
| 2017/0046773 | A1* | 2/2017 | Hendricks, II | G06Q 30/0635 |
| 2017/0135412 | A1* | 5/2017 | Cameron | A24F 40/51 |
| 2017/0258136 | A1 | 9/2017 | Hawes et al. | |

FOREIGN PATENT DOCUMENTS

| | | | |
|---|---|---|---|
| JP | 2019512245 A | 5/2019 | |
| WO | 2010075878 A2 | 7/2010 | |
| WO | 2014144802 A1 | 9/2014 | |
| WO | 2014199233 A2 | 12/2014 | |
| WO | WO-2016096337 A1 * | 6/2016 | ............. A24F 15/18 |
| WO | 2017205692 A1 | 11/2017 | |

OTHER PUBLICATIONS

International Search Report including the Written Opinion from Application No. PCT/EP2018/085640 dated Jan. 23, 2019, 14 pages.

Summons to attend oral proceedings pursuant to Rule 115 (1) EPC for App No. 18816154.1, dated Feb. 14, 2023, pp. 1-11.

* cited by examiner

APPARATUS FOR LOCATING AEROSOL GENERATING CONSUMABLES

CROSS-REFERENCE TO RELATED APPLICATIONS

The present application is a national phase entry under 35 U.S.C. § 371 of International Application No. PCT/EP2018/085640, filed Dec. 18, 2018, which claims priority to European Application No. 17208196.0 filed Dec. 18, 2017, the disclosures of which are incorporated herein by reference.

FIELD OF INVENTION

The present invention relates to an apparatus and method for improving the ease with which a user can locate aerosol generating consumables for use in an aerosol generation device, such as an electronic cigarette.

BACKGROUND

Electronic cigarettes and other aerosol generation devices are becoming increasingly popular among consumers. Unlike conventional cigarettes, which are consumed, an electronic cigarette is intended to be re-filled and used many times.

Aerosol generating consumables need to be obtained periodically by users. One challenge in this field is to assist users in locating retailers that can supply appropriate aerosol generating consumables.

SUMMARY OF THE INVENTION

According to an aspect of the invention there is provided a system comprising: a positioning module configured to determine a position associated with an electronic user device; a data storage unit configured to store information regarding retailers of aerosol generating consumables, said information including at least a position of the retailers; and a processor configured to determine a plurality of distances between the position associated with the electronic user device and the respective positions of the retailers, and to generate instructions to display information related to at least one of the retailers if the at least one retailer is within a predetermined range of the position associated with the electronic user device.

In this way, information can be displayed regarding the retailers, and their respective positions with respect to the user. The user can therefore be assisted in finding a retailer for aerosol generating consumables. The displayed information preferably relates to the closest retailer or retailers to the position associated with the electronic user device. In one arrangement the predetermined range can be increased if no retailers are found, or if the number of retailers is less than a predetermined value. Thus, there may be a first predetermined range and a second predetermined range.

Preferably the stored information regarding retailers includes information on whether the retailers deal with a plurality of types of aerosol generating consumable, and the processor is preferably configured to determine a first consumable type associated with the electronic user device, and to select retailers that deal with the first consumable type. In this way, information can be displayed about retailers only if they deal with the first type of consumable. The first type of consumable associated with the consumer may be determined based on information in an account associated with the consumer. Alternatively, the first type of consumable may be determined dynamically.

The system may include an aerosol generating device which is adapted for communicative connection with the electronic user device. The electronic user device may be a mobile phone, tablet or personal computer, in just a few examples. The position of the user can be assumed, based on the position of the electronic user device. The aerosol generating device can be connectable to the electronic user device using a connection cable or a wireless protocol such as Bluetooth®.

The processor may be configured to determine the first consumable type based on properties of the aerosol generating device. The electronic user device may have access to a local or remote database that records a consumable type for an aerosol generating device based on its model or serial number. The properties of the aerosol generating device may be determined by the processor based on features of a communication exchange.

The processor may be configured to determine the first consumable type based on data transferred (e.g. a serial number of the aerosol generating device and/or a serial number of a consumable that is used by said device) between the electronic user device and the aerosol generating device. Thus, if the connected aerosol generating device requires a particular type of consumable then this can be detected so that only relevant retailers are displayed on the display screen.

If the processor is able to detect a plurality of types of aerosol generating device then this can be detected and retailers for all possible types of consumable can be displayed.

The positioning module preferably comprises a positioning sensor in the electronic user device. For example, the positioning sensor may comprise a GNSS receiver in the electronic user device can be used to determine position. The positioning sensor could also determine position using cellular positioning techniques, Wi-Fi or dead reckoning.

The system may include the electronic user device, which may include a display screen for displaying the information related to the at least one retailer. The displayed information can include the position of the retailer and information on the type of aerosol generating consumable that is available.

The stored information regarding retailers may include information on stocks of a plurality of types of aerosol generating consumable, and the processor may be configured to determine a first consumable type associated with the electronic user device, and to select retailers that have stock available for the first consumable type.

The system may include a display screen that is configured to display position information related to the at least one retailer. Preferably retailers are displayed on a map together with the position associated with the electronic user device, which corresponds to the assumed position of the user.

A navigation module may be provided to generate navigation instructions from the position associated with the electronic user device to the position of the at least one retailer, and the processor may be configured to generate instructions to display the navigation instructions. The navigation module may be provided in a third party server.

According to another aspect of the invention there is provided a method comprising: determining a position associated with an electronic user device; retrieving information from a database regarding retailers of aerosol generating consumables, wherein the retrieved information includes at least a position of the retailers; determining a plurality of distances between the position associated with the electronic user device and the respective positions of the retailers; and displaying information related to at least one of the retailers on a display screen of the electronic user device if the at least one retailer is within a predetermined range of the position associated with the electronic user device. The method may implement any feature of the preceding aspect.

The retrieved information regarding retailers preferably includes information on whether the retailers deal with a plurality of types of aerosol generating consumable, and the method preferably includes determining a first consumable type associated with the electronic user device, and selecting retailers that deal with the first consumable type.

The method preferably involves determining the first consumable type based on data transferred between the electronic user device and an aerosol generating device.

The retrieved information preferably includes information on stocks of a plurality of types of aerosol generating consumable. The method preferably involves determining a first consumable type associated with the electronic user device, and selecting retailers that have stock available for the first consumable type.

According to yet another aspect of the invention there is provided a computer readable memory medium comprising executable instructions stored thereon which, when executed by a computer, cause the computer to undertake method steps as defined in the previous aspect.

BRIEF DESCRIPTION OF THE DRAWINGS

Embodiments of the invention are now described, by way of example, with reference to the drawings, in which.

DETAILED DESCRIPTION

Before describing several embodiments of the system, it is to be understood that the system is not limited to the details of construction or process steps set forth in the following description. It will be apparent to those skilled in the art having the benefit of the present disclosure that the system is capable of other embodiments and of being practiced or being carried out in various ways.

As used herein, the term "aerosol generation device" or "electronic cigarette" may include smoking apparatus to deliver an aerosol to a user, including an aerosol for smoking. An aerosol for smoking may refer to an aerosol with particle sizes of 0.5-7 microns. The particle size may be less than 10 or 7 microns. The apparatus may be portable. Portable may refer to the apparatus being for use when held by a user.

As used herein, the term "processor" or "processing resource" may refer to one or more units for processing including as an ASIC, microcontroller, FPGA, microprocessor, digital signal processor (DSP) capability, state machine or other suitable component. A processor may include a computer program, as machine readable instructions stored on a memory and/or programmable logic.

Figure 1:
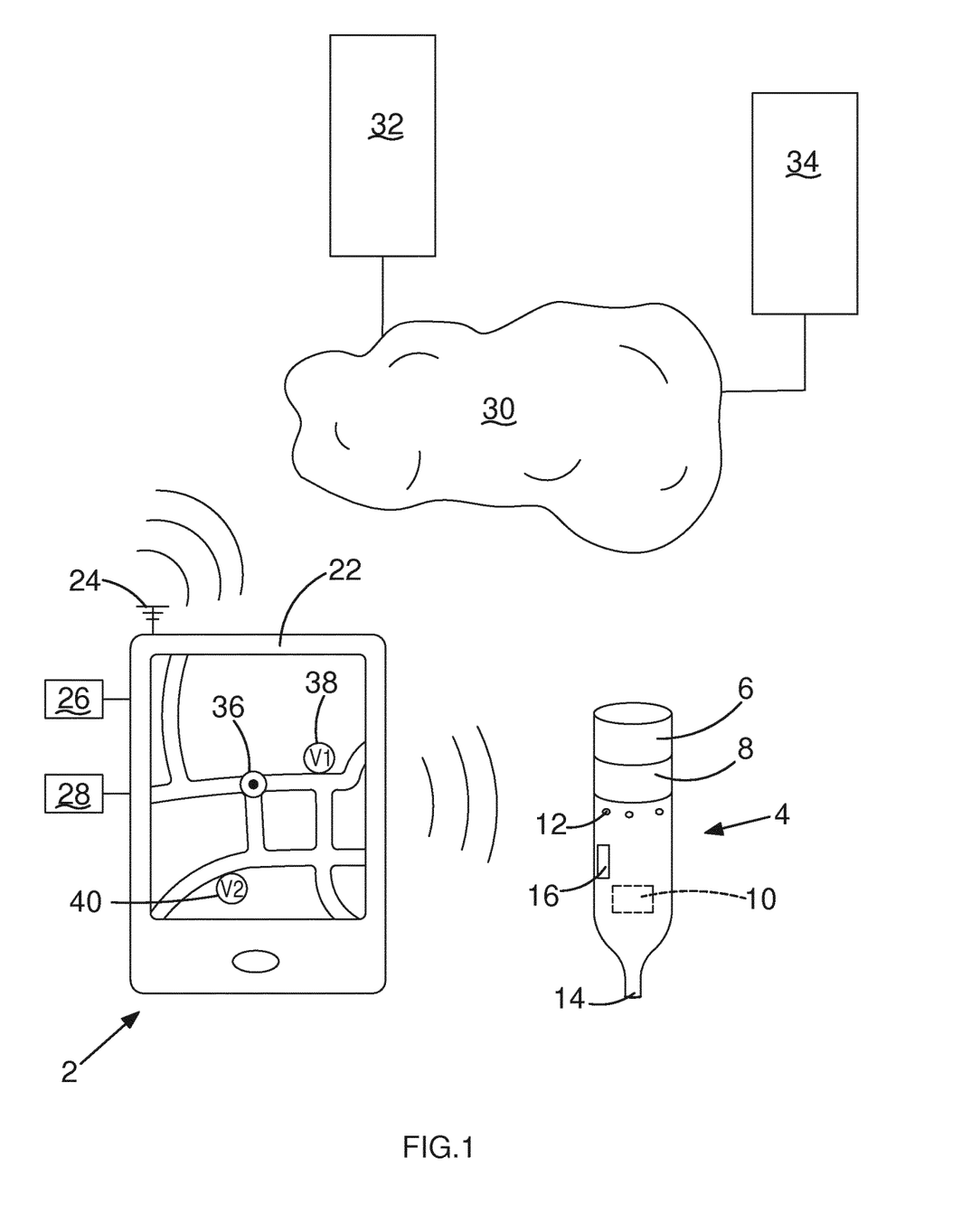
FIG. 1 is a schematic view of a smartphone in communication with an electronic cigarette and a communications network, in an embodiment of the present invention.

FIG. 1 is a schematic view of a smartphone 2 and an electronic cigarette 4. The electronic cigarette 4, which is an aerosol generation device, comprises a battery 6 and a reservoir 8 for storing vaporisable liquid from which the aerosol is generated. The vaporisable liquid in the reservoir 8 can be supplied to an atomiser 10, powered by the battery 6. Air inlets 12 are provided in the body of the electronic cigarette, and an airflow can be generated by a user inhaling via a mouthpiece 14. The airflow can draw air into the air inlets 12 and past the atomiser 10 so that the user can inhale air which includes vaporised liquid from the reservoir 8.

The reservoir 8 may include a sensor (not shown) for determining the volume of vaporisable liquid. In this way, electronic cigarette 4 can generate an alert when the volume of vaporisable liquid drops below a threshold value.

Alternative aerosol generation devices may be provided that are not based on vaporisable liquid. In one example, an aerosol generation device can be supplied with capsules containing conventional tobacco. These capsules can be heated, without burning the tobacco, to release vapours that can be carried away from the capsule in an airflow.

These aerosol generation devices share a common feature in that they require an aerosol generating consumable in use. Once depleted, the aerosol generating consumable can be replenished. This may be achieved by refilling a storage compartment, such as a reservoir, with the relevant aerosol generating consumable. The aerosol generating consumable may be stored in any desirable physical state; currently preferred physical states are solid or liquid, but gaseous aerosol generating consumables may also be possible. An aerosol generating consumable may also be provided as a disposable and replaceable unit. In one example the aerosol generating consumable can be a disposable cartomizer unit which has a reservoir of vaporisable liquid and an integrated atomizer. Other examples of disposable and replaceable units include a pod or stick of tobacco (or other aerosol forming material).

The electronic cigarette 4 comprises a communication interface 16, e.g. a Bluetooth® transmitter, which can be used to establish a communicative interaction with a corresponding Bluetooth transmitter 24 in the smartphone 2. The smartphone 2 also comprises electronics for wireless communication with a network 30 based on cellular technology and Wi-Fi.

The smartphone 2 comprises a GPS receiver 26 that can monitor geographic position. GPS signals are typically only available in an outdoor environment, and the smartphone 2 is adapted to determine a position using alternative techniques when GPS signals are not available. A few examples of alternative techniques include Wi-Fi positioning, dead reckoning and cellular positioning. A data storage unit 28 is also provided in the smartphone 2.

The smartphone 2 is communicatively connected to the network 30. A mapping and navigation server 32 and a retailer information server 34 can be accessed by the smartphone 2 via the network 30.

Figure 2:
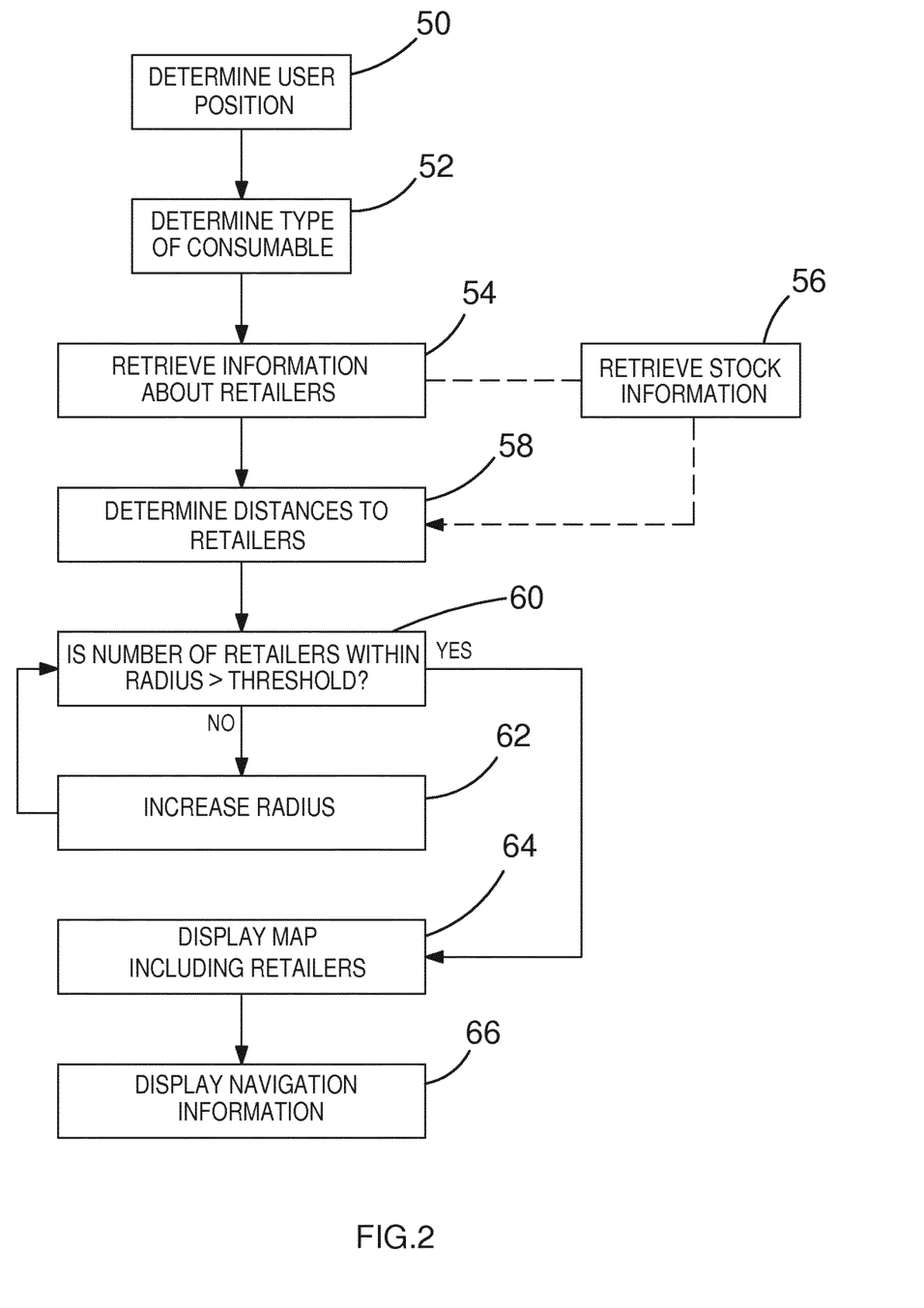
FIG. 2 is a flow diagram showing steps that can be undertaken in an embodiment of the present invention.

FIG. 2 is a flow diagram showing steps that can be undertaken in an embodiment of the invention. In one example, the steps can be initiated when a user operates their smartphone 2 to select a "nearest store" icon corresponding to a mobile application. In another example, the steps can be initiated when it is determined that the volume of vaporisable liquid in the reservoir 8 has dropped below a threshold value or an overall stock of consumables is below a threshold level. At step 50 in FIG. 2 the smartphone 2 is adapted to determine a position using the GPS receiver 26. The position of the smartphone 2 can be assumed to correspond to the position of the user.

At step 52 a processor in the smartphone 2 is configured to determine a type of aerosol generating consumable that is required. The aerosol generating consumable can correspond to a type or brand of vaporisable liquid or a type or brand of capsule for use in one of the aforementioned embodiment devices. In a first example the smartphone 2 is configured to store details in the data storage unit 28 relating to any electronic cigarettes 4 with which a communicative connection has been established. At step 52 the processor can retrieve information about electronic cigarettes 4 that have been connected, such as model, serial number and type of aerosol generating consumable currently used. The processor may retrieve details related to several electronic cigarettes 4, as stored in a stack memory, if more than one device has been connected to the smartphone 2. The processor may retrieve details related to 5-20 of the most recently connected electronic cigarettes 4. In a second example the user may be able to manually input information about their electronic cigarette 4 and/or their preferred type of aerosol generating consumable to the smartphone 2. In a third example, the aerosol generating consumable is identified based on a user account or user profile stored on the smartphone 2. The user account or user profile can be accessed as part of, or by way of, mobile application running on the smartphone 2. The second and third examples can be implemented using electronic cigarettes which do not include a communication interface. In the examples the processor can identify a type or types of consumable associated with the user.

At step 54 the smartphone 2 is configured to retrieve information about retailers that deal in the type of consumable identified at step 52. This is achieved by sending a request to the retailer information server 34. The retailer information server 34 receives the request from the smartphone 2 and consults an internal database to determine a list of retailers that can supply the relevant consumable. The database includes various details about the retailers including their name and location. In some embodiments the database stored at the retailer information server 34 could be stored or downloaded to the smartphone 2. This can allow the smartphone 2 to determine information regarding retailers that can supply the relevant consumable, even when a communicative connection is not available, or to avoid repeated requests to the retailer information server 34.

At optional step 56 the retailer information server 34 can determine stock information for the list of retailers. This can be determined based on stock information that is held by the retailer information server 34. The retailer information server 34 can poll individual retailers periodically to update the information that is held about stocks to ensure that its data are up to date. The retailers' current stock may be updated based on an amount of consumables that have been supplied and sales of said consumables to consumers.

At step 58 the smartphone 2 can determine distances to respective retailers based on the position of the smartphone 2 determined at step 50 and the information stored in the retailer information server 34 regarding the location of the retailers. Step 58 could alternatively be undertaken at the retailer information server 34 if the smartphone 2 transmits its position with the request at step 52. Step 58 may be performed using known geometric techniques based on coordinates of the smartphone 2 and retailer.

At step 60 the smartphone 2 can determine whether the number of retailers identified within a first radius, centred on the position of the smartphone 2, is above a predetermined threshold. In one example, the first radius may be 1 km and the predetermined threshold may be a single retailer. If no retailers are found within 1 km of the smartphone position then the radius can be increased to 2 km at step 62. A further analysis can then be performed at step 60 to determine whether one or more retailers can be found within that expanded search radius. The search radius can be increased progressively until at least one retailer is found. Thus, the initial preference is to display information about retailers within the immediate vicinity of the user's position, but only if enough retailers can be found within that area. If there are not enough retailers in the immediate vicinity then the radius is expanded outwards until a sufficient number of retailers can be provided. Likewise, by expanding progressively the radius a user is unlikely to be overloaded with a large number of retailers.

At step 64 the smartphone 2 is configured to display a map on the display screen 22. An example of a map is shown on the display screen 22 of the smartphone in FIG. 1. The map may be centred as illustrated on the position of the smartphone 2, which is marked with an indicator 36. The map data can be downloaded from the mapping and navigation server 32. The map also includes icons 38, 40 for two retailers of the aerosol generating consumable. In this example the retailers are identified at step 54 as retailers that deal with the type of aerosol generating consumable used by the user. At step 56 the retailers can be further filtered to include only those retailers that have stock available for the relevant consumable.

The icons 38, 40 are selectable, as displayed on the map on the display screen 22. The icons 38, 40 can be displayed with indications to represent the consumables which the retailer stocks. For example, the size of the icons 38, 40 may be indicative of the number of consumables in stock at the relevant retailer. At step 66 a user can select one of the icons 38, 40. A request is then transmitted by the smartphone 2 to the mapping and navigation server 32 to generate navigation instructions from the position of the smartphone 2 to the position of the relevant retailer. The mapping and navigation server 32 can then generate travel instructions, based on selectable modes of transport, to the relevant location. These steps can assist a user of a smartphone in identifying the location of a retailer for the aerosol generating consumable that is required.

As explained above, at step 52 the processor may retrieve details related to a number of the most recently connected electronic cigarettes 4, and can determine a plurality of compatible types of consumable. In this example, at step 54, the smartphone 2 can retrieve information about retailers that deal in at least one of the compatible consumables. At step 64 icons for the retailers can be displayed on a map on the display screen 22. The icons can be displayed with indicators that can provide information about the type(s) of consumable that are available from the relevant retailer. In this way, icons can be included for retailers if they supply at least one of the consumables. A user may be able to examine the icons on the map to determine which retailer has available stocks for each consumable.

Processing steps undertaken at one entity could alternatively be performed at another entity. Thus, processing steps performed at the smartphone 2 could be undertaken by the retailer information server 34 or the mapping and navigation server 32, and vice-versa. It is also possible for individual processing steps to be split between entities.

Figure 3:
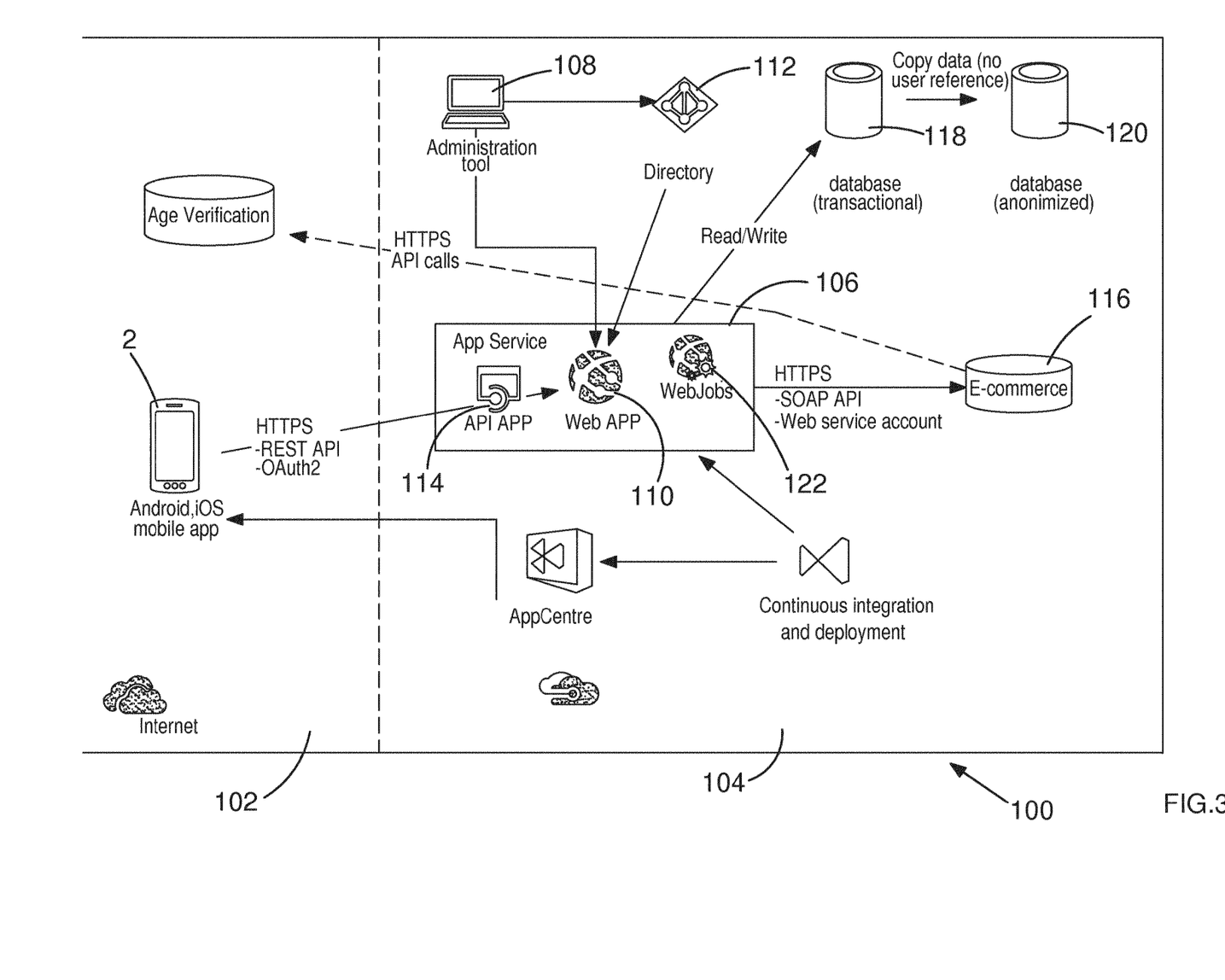
FIG. 3 is a schematic view of a system in an embodiment of the present invention.

FIG. 3 is an exemplary embodiment of a system according to the present invention including a smartphone 2 within a system 100 based on two parts: a frontend system 102 and a backend system 104. The frontend system 102 includes the smartphone 2 comprising a GPS receiver, where a mobile application is provided in the smartphone 2. The mobile application allows a user to provide registration, age verification and login details, input data or make user requests to the backend system 104, such as online purchases or store locator queries to the retailer information server 34. The mobile application is adapted to store in the smartphone data storage 28, or send to the network 30, geographic positions of one or more electronic cigarettes 4, where a user can use the mobile application to locate a particular electronic cigarette. The geographic position is based on the latitude and longitude of an electronic cigarette after a trigger event has occurred and the time and location details are provided to the data storage, the mapping and navigation server 32 or network 30. The mobile application can also store the geographic position of the smartphone 2 to be sent to the backend system 104. A user may also provide information to the backend system 104 via an internet application, or web app.

The backend system 104 receives user information, user requests and specific electronic cigarette information from the frontend system 102 at an App service 106. The backend system 104 includes:

Administration tool 108 and Administration Web App 110: these components are the administrative part of the backend system 104. Roles, permissions, user management system configuration and administrative activities on certain system functions are handled, and the Admin Web App 110 makes calls to an active directory 112 for a single sign on user authentication mechanism.

Active directory 112: this component performs user or client verification in actions including: registration, login, buy online and store locator. The active directory 112 is used to tenant the administration web app 110 and an API (application program interfaces) app 114, based on a cloud directory and identity management service. Active directory 112 combines core directory services, advanced identity governance and application access management.

API App 114: The API App contains all the APIs exposed by the backend system 104 and the calls to E-commerce API 116. The E-commerce API 116 receives data for electronic commerce actions, such as registration, login, buy online and store locator. Users or clients accessing the backend system 104 through API App 114. To authorise access in the API App 114, the mobile application requires an access token from active directory 112.

Transactional database 118: the transactional database may be a, for instance a structured query language, SQL, database or similar type of database in which Administration Web App 110 and API App 114 reads and writes data to. The transactional database contains information from the whole backend system. A project or an SQL project is created for each part of the database containing all necessary scripts: for creating tables, functions and stored procedures. The transactional database is split in three schemas: the administration schema, the application schema, and the security schema.

Anonymized database 120: this component, which may be based on SQL, contains only statistical information, without any information about a user. Data is copied without any information about the user from Transactional database 118, the process being done by WebJobs component 122. Data anonymization is a type of information sanitization whose scope is to protect privacy. Anonymized database 120 contains a certain set of anonymized data related to vaping activities and will be available for reporting purposes. Personal identifiable information from data set will be removed so that the people whom the data describe remain anonymous. There are no references to users in the anonymized data set.

WebJobs component 122: this component contains two web jobs, containing C# codes. One WebJob is used to copy data from transactional database 118 to anonymized database 120. The other WebJob is implemented for data purge from transactional database 118 every six months or other predetermined period of time.

The backend system 104 is structured into different layers where each layer has its own role to help the communication between the frontend system 102 and the backend system 104. This approach exposes some of the core functionality as services for user or client applications (e.g. using Android and iOS) to consume, which helps to minimise the impact of adding new APIs or new business logic to the overall system. The layers separate database logic, business logic, application program interfaces (API) and administration tools in provided services to a user mobile application.

Figure 4:
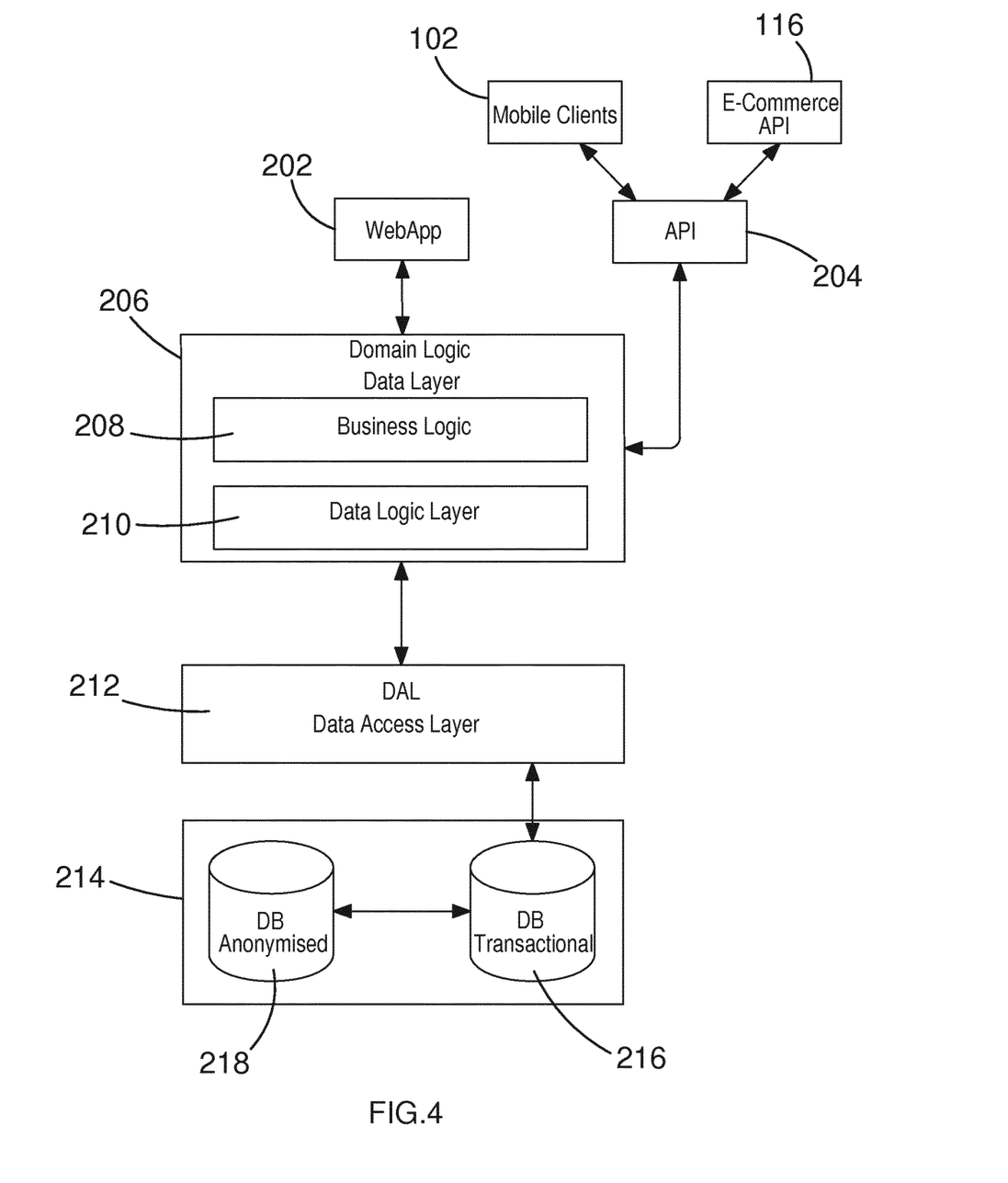
FIG. 4 is another schematic view of a system in an embodiment of the present invention.

FIG. 4 shows a representation of a layered application 200 that may be implemented in the backend system 104 (shown in FIG. 3) according to an embodiment of the present invention. Each layer helps the communication of the user or client with the databases and the APIs.

The layers are described in more detail below:

WebApp layer 202: The WebApp layer 202 (or presentation layer) is a web application developed which implements a presentation layer for administration. This application maintains a session, being scalable, also maintains the E-commerce API and mobile clients, iOS and Android, and the calls between backend application and clients.

API layer 204: This layer is a separated project built to manage the APIs, a stateless application to realize the calls between E-commerce API and mobile clients, iOS and Android, and the calls between backend application and clients. This layer will send and receive data from the domain logic layer. The API layer 204 contains the routes to the backend, the methods to communicate with the domain logic layer 206, using the domain logic models, and API versioning.

Domain logic layer 206: The domain logic layer 206 is built to separate the business logic from the rest of the backend application. This layer uses a generic repository, domain logic models and dependency injection. The domain logic layer includes a business layer 208 and a data model layer 210

Data access layer 212: The data access layer 212 has the role to get the data from a database, creating the models for the tables from database. This layer helps the backend application to communicate with the database, using an Entity framework, data access layer models (code first/database first) and the database context.

Database layer 214: The database layer 214 is split in two different layers: the transactional database layer 216 and the anonymized database layer 218. Both are Projects that can be based on SQL and are developed for creating the tables, the functions and the stored procedures needed to receive data from a database. The anonymized database layer 218 is created to store different statistics, for example: the number of puffs, how often the cigarette is used, but without storing personal data about the user in this table. The transactional database layer 216, has the role to create the tables, the functions and the stored procedures to store data about the administration, such as: actions, firmware version, localization version, and about the applications, such as: about the capsule, the device, the user and also about vaping activity of the user.

Figure 5:
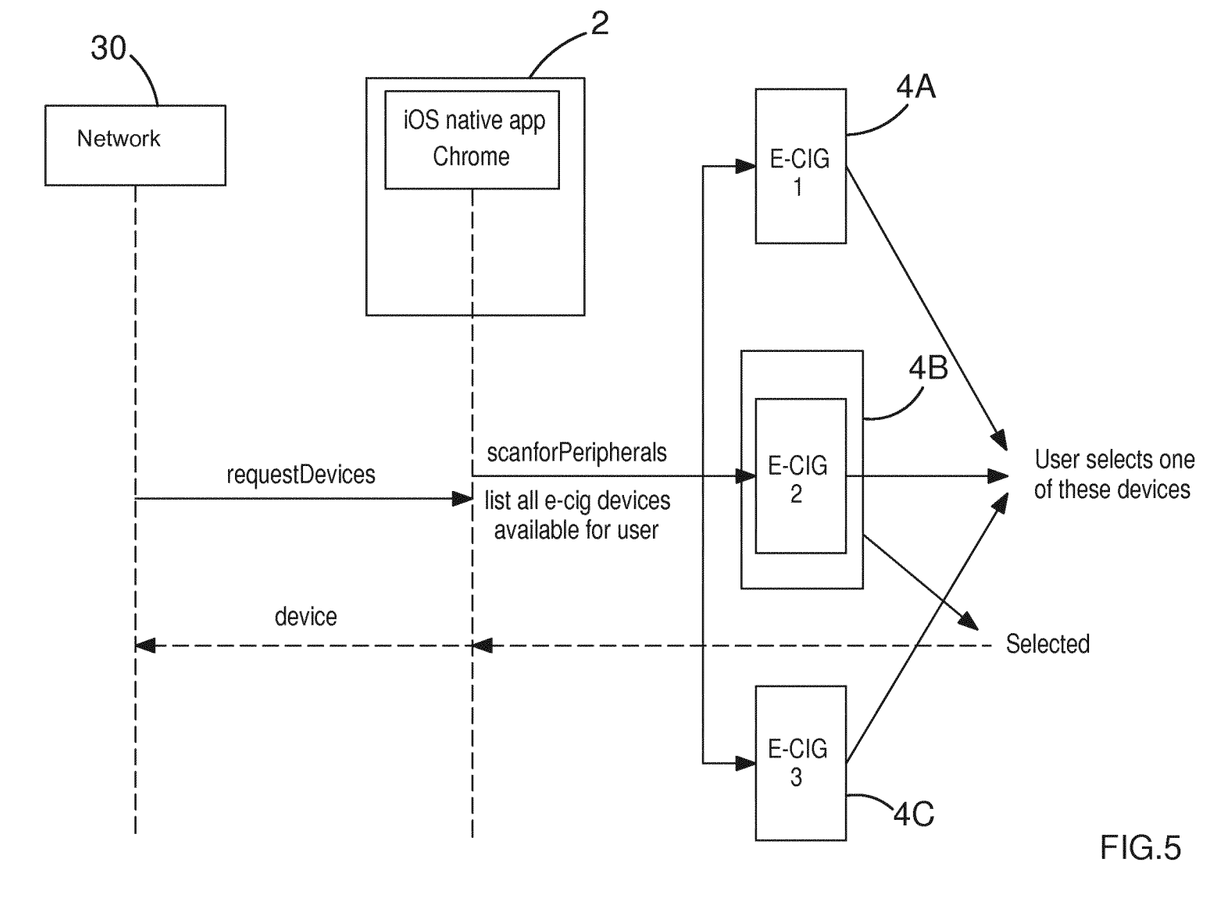
FIG. 5 is another schematic view of a smartphone in communication with a network and an electronic cigarette, in an embodiment of the present invention.

FIG. 5 shows a schematic representation of the communication between the network 30 via server 32, smartphone 2, and a plurality of electronic cigarette devices according to an embodiment of the invention. The smartphone 2 and any connected electronic cigarette devices may be located in the frontend system 102 (shown in FIG. 3), and the network 30 allows for communication between the front end system 102 and the backend system 104 (shown in FIG. 3). The network 30 can perform a scan of electronic cigarette devices for communication with the network. A command is sent to a mobile application on the smartphone 2 which then scans for all the available cigarette devices 4A, 4B, 4C available to a user. Electronic cigarette devices 4A, 4B, 4C are connected to the smartphone 2 via Bluetooth®. The mobile application displays a list of the available devices for the user to select a device from the list, and the application sends information relating to the selected device to the network 30.

After a connection is established the network 30 can communicate with an electronic cigarette device 4B through the mobile application in a smartphone 2. The mobile application can read or write data from/to the cigarette device 4B, and the network can notify the mobile application when a change has occurred, e.g. when a capsule requires changing/replacing or battery power in the device is low.

Additional functions, or services, are as follows:

Authentication: This step is required to get a device's information: device id, device mac address, capsule information and to communicate with the device. The process is done using characteristics for reading, writing and notifying.

Capsule info: This service is used to read capsule information: puffs left, nicotine left, etc. The PWA app can read capsule info and can be notified by an electronic cigarette device when the capsule is changed.

Device info: This service is used to read information about the device using a read characteristic.

Device settings: This service is used to change device settings (sleep time, max puff duration) and also to use functionalities like: find device, reboot device, reset device using the write characteristics.

Event info: This service is used to receive notifications from device to the network when a malfunction has occurred (software over temperature, dry vape, hardware over temperature)

Over the air: This service is used to update, from the network, the firmware of the electronic cigarette device based on write and notify characteristics.

Vaping: This service is used to get information when user is vaping. So, the network is notified when user is smoking, getting the duration, the temperature, info about the liquid, using the notify and write functions/characteristics.

If an internet connection is lost, communication between the mobile application and the device 4B can work in the same way, and information about the device 4B is saved in a data storage of the smartphone 2. Local storage is a read-only property that allows the mobile application to access the data storage 28 in the smartphone 2 from mobile application. Web storage is per origin (per domain and protocol). Unlike cookies and session storage, local storage doesn't have an expiration date (data can be stored until removed). As an example, if the puffs or events could not be sent because of no internet connection, the information or data are saved in the smartphone data storage which then are sent to the network or backend system when internet connection is established. The same approach is done for device information (id, mac address, serial code, name, Bluetooth® version, temperature, capsule information), saving temporary values that should be sent to the backend system later.

The invention claimed is:

1. A system for locating retailers, the system comprising:
a positioning module configured to determine a position associated with an electronic user device;
an aerosol generating device which is adapted for communicative connection with the electronic user device;
a data storage unit configured to store information regarding retailers of aerosol generating consumables, said information including at least a position of the retailers, wherein the stored information regarding retailers includes information on whether the retailers deal with a plurality of types of aerosol generating consumable and stock information for each of the retailers; and
one or more computing devices configured to determine an overall stock of consumables for at least one of the retailers is below a threshold level based on the stock information stored in the data storage unit,
wherein, based on determining the overall stock of consumables is below the threshold level, the one or more computing devices are further configured to:
determine a first consumable type associated with the electronic user device based on data transferred between the electronic user device and the aerosol generating device;
retrieve a listing of retailers that deal with the first consumable type;
determine, based on the retrieved listing of retailers, a subset of retailers that have the first consumable type in stock;
determine a plurality of distances between the position associated with the electronic user device and the respective positions of the subset of retailers within a first predetermined range;
increase the first predetermined range to a second predetermined range if no retailers in the subset of retailers are found within the first predetermined range; and
generate instructions to display information related to at least one of the retailers of the subset of retailers on a display of the electronic user device when the at least one retailer is within the first predetermined range or the second predetermined range of the position associated with the electronic user device.

2. The system of claim 1, wherein the one or more computing devices are configured to determine the first consumable type based on properties of the aerosol generating device.

3. The system of claim 1, further comprising the electronic user device including a display for displaying the information related to the at least one retailer.

4. The system of claim 3, wherein the positioning module comprises a positioning sensor in the electronic user device.

5. The system of claim 1, wherein the stored information regarding retailers includes information on stocks of a plurality of types of aerosol generating consumable, and wherein the one or more computing devices are configured to determine a first consumable type associated with the electronic user device, and to select retailers that have stock available for the first consumable type.

6. The system of claim 1, further comprising a display configured to display position information related to the at least one retailer.

7. The system of claim 1, comprising a navigation module configured to generate navigation instructions from the position associated with the electronic user device to the position of at least one retailer, wherein the one or more computing devices are configured to generate instructions to display the navigation instructions.

8. The system of claim 1, wherein the one or more computing devices include the electronic user device.

9. A method for locating retailers, the method comprising:
   determining, by one or more computing devices, an overall stock of consumables for at least one retailer is below a threshold level based on stock information; and
   based on determining the overall stock of consumables is below the threshold level:
   determining a position associated with an electronic user device;
   transferring data between the electronic user device and an aerosol generating device;
   determining a first consumable type based on data transferred between the electronic user device and the aerosol generating device;
   retrieving information from a database regarding retailers of aerosol generating consumables, wherein the retrieved information includes at least a position of the retailers, and wherein the retrieved information includes information on whether the retailers deal with a plurality of types of aerosol generating consumable and stock information for each of the retailers;
   determining the first consumable type associated with the electronic user device;
   retrieving a listing of retailers that deal with the first consumable type;
   determining, based on the retrieved listing of retailers, a subset of retailers that have the first consumable type in stock;
   determining a plurality of distances between the position associated with the electronic user device and the respective positions of the subset of retailers within a first predetermined range;
   increasing the first predetermined range to a second predetermined range if no retailers in the subset of retailers are found within the first predetermined range; and
   displaying information related to at least one of the retailers on a display of the electronic user device when the at least one retailer of the subset of retailers is within the first predetermined range or the second predetermined range of the position associated with the electronic user device.

10. A non-transitory computer readable memory having executable instructions stored thereon which, when executed by a computer, cause the computer to undertake steps comprising:
    determining an overall stock of consumables for at least one retailer is below a threshold level based on stock information; and
    based on determining the overall stock of consumables is below the threshold level:
    determining a position associated with an electronic user device;
    transferring data between the electronic user device and an aerosol generating device;
    determining a first consumable type based on data transferred between the electronic user device and the aerosol generating device;
    retrieving information from a database regarding retailers of aerosol generating consumables, wherein the retrieved information includes at least a position of the retailers, and wherein the retrieved information includes information on whether the retailers deal with a plurality of types of aerosol generating consumable and stock information for each of the retailers;
    determining the first consumable type associated with the electronic user device;
    retrieving a listing of retailers that deal with the first consumable type;
    determining, based on the retrieved listing of retailers, a subset of retailers that have the first consumable type in stock;
    determining a plurality of distances between the position associated with the electronic user device and the respective positions of the subset of retailers within a first predetermined range;
    increasing the first predetermined range to a second predetermined range if no retailers in the subset of retailers are found within the first predetermined range; and
    displaying information related to at least one of the retailers on a display of the electronic user device when the at least one retailer of the subset of retailers is within a predetermined range or the second predetermined range of the position associated with the electronic user device.

* * * * *